Patented June 13, 1939

2,162,437

UNITED STATES PATENT OFFICE 2,162,437

METHOD OF MAKING STEEL

Clarence D. King, Brooklyn, N. Y.

No Drawing. Application December 22, 1937,
Serial No. 181,227

5 Claims. (Cl. 75—28)

This invention relates to methods of making steel. One of the objects is to provide an improved process for making steel. Another object is to provide a more economical process for making steel than heretofore practiced in the art. Other objects and advantages will be apparent as the invention is more fully disclosed.

In the manufacture of steel by the basic open hearth methods common to the art, relatively large volumes of slag are produced. These slags contain various amounts of iron and manganese oxides, and of phosphorus compounds. Other constituents of the slag are calcium oxide (or lime) and silica. The iron, manganese, phosphorus and lime content of the slag represents economical values too useful to be discarded, but heretofore in the art no economically practical method for the complete recovery and use of these constituents has been proposed.

In accordance with the present invention, I propose to utilize the open hearth slag as a component of the usual charge in a blast furnace, regulating the proportion of constituents in the blast furnace charge so that a pig iron containing high phosphorus and high manganese is obtained. By high phosphorus is meant over .70% and by high manganese is meant over 5.00%.

I then propose to blow this P-Mn pig iron first in an acid Bessemer furnace to convert the Si and Mn content thereof to oxide. The silica, manganese oxides, together with such iron oxides formed during the blowing of the pig iron form a slag which is separated from the P-containing iron. I propose to return this slag to a blast furnace wherein the Mn content is recovered by being again reduced and converted into siliconspiegel in which form it may be utilized as Mn additions to molten iron or steel baths replacing equivalent amounts of ferro-manganese. The P-containing iron from the acid Bessemer is then treated with a basic oxidizing slag, preferably in a regenerative furnace, which slag rapidly abstracts or removes the phosphorus from the iron forming a slag adapted by reason of its high phosphorus content for use as a soil conditioner. After separating the P-containing slag from the molten iron the iron may be further refined in accordance with standard practice under a second basic oxidizing slag until the carbon and phosphorus content has been reduced to the desired percentage and the desired final steel composition is obtained.

Referring to the process in greater detail, the first step in the process consists in the use of very large amounts of open hearth slag in blast furnaces for the purpose of producing an iron high in phosphorus, above .7%; and high in manganese, above 5%. If the use of open hearth slag does not assure sufficient manganese and phosphorus, the additional phosphorus may be built up from phosphate rock or high phosphorus ores or high phosphorus manganiferous ores.

A comparison of standard basic iron burden and a typical burden required for the high phosphorus high manganese iron is, as follows:

|  | Standard basic iron (pounds per ton ingots) | High phosphorus, high manganese iron (pounds per ton ingots) |
| --- | --- | --- |
| Ore | 3,712 | 2,631 |
| Sinter | 171 | 171 |
| Roll scale | 75 | 75 |
| Open hearth slag | 406 | 2,000 |
| Limestone | 873 | 559 |
| Coke | 1,992 | 2,138 |
| Iron analysis: |  |  |
| Phosphorus | .292% | 1.02% |
| Manganese | 2.36 | 7.50 |

The second step consists of using an acid Bessemer converter to blow said iron, all the phosphorus of the iron being retained in the blown metal since the acid process does not permit the elimination of the phosphorus, and virtually all the manganese and silicon being oxidized and carried into the slag. For example, the following represents an actual test blowing of iron of this character in an acid converter:

Analysis of pig iron: Per cent
    Carbon _____ 4.50
    Manganese _____ 6.50
    Sulphur _____ .026
    Silicon _____ .98
Analysis of blown metal:
    Carbon _____ .33
    Manganese _____ .31
    Sulphur _____ .020
    Silicon _____ .008
Analysis of final slag:
    $SiO_2$ _____ 34.10
    FeO _____ 2.39
    $Fe_2O_3$ _____ .64
    MnO _____ 58.10

It will be noted from the above analysis that the extremely high manganese content of the pig iron materially assists in desulphurizing the blown metal, which is a collateral value of the process since the use of such high manganese is not ordinarily possible or practical in steel production. It will also be noted that the manganese is virtually eliminated from the blown metal and transferred to the slag in the form of manganese oxide as high as 58.10%. While those familiar with the art have questioned the feasibility of blowing high manganese iron, I have demonstrated that this can be accomplished practically.

The third step of this process is the reduction of the Mn-containing slag in a blast furnace to form silicon-spiegel by well known practice, which can be regulated to produce from this slag as part of the burden a silico-spiegel of 10–20%, or more, of silicon and 20–40%, or more, of manganese. This silico-spiegel may be substituted for appreciable amounts of ferro-manganese and silicon now required in steel making operations, resulting in a material reduction in the amount of foreign high grade manganese ores now required to produce standard ferro-manganese. This is a particularly valuable feature in the event that high grade manganese ores are difficult to obtain from foreign sources for one reason or another.

The fourth step in the process is to use the high phosphorus blown metal resulting from the second step to form a high phosphorus slag adapted for use as a soil conditioner. The blown metal is placed in a tilting open hearth furnace together with roll scale or other forms of iron oxide, and limestone, or other forms of lime to form a basic oxidizing slag which combines with the phosphorus content of the blown metal. The resultant P-containing slag is separated from the metal, and ordinarily such slag will contain 12%, or more, $P_2O_5$ and, therefore, is highly suitable for soil conditioning purposes. The remaining slag on the metal is diluted by additional lime and the steel is further refined and finished in the usual manner, until the final desired composition is obtained. By the practice of this invention I may obtain a low phosphorus, low sulphur open hearth steel if desired. From the above description of the present invention it is believed obvious that the process has specific economies and advantages over present-day methods, which may be enumerated as follows:

1. Replacement of appreciable amounts of limestone and ore in blast furnace burdens by lime, manganese and iron now wasted in open hearth slags.

2. The recovery of the phosphorus content of open hearth slags in a useful form—soil conditioner.

3. The recovery of the manganese content of the open hearth slag in a useful form—silico-spiegel.

4. A reduction in the amount of ferro-manganese and a collateral reduction in the amounts of foreign high-grade manganese ores required in the manufacture of steel.

5. The economical production of unusually low sulphur and standard phosphorus content of basic open hearth steel.

From the above description of the present invention it is apparent that the same may be widely modified without departure from the nature and scope thereof and all such modifications are contemplated as may fall within the scope of the following claims:

What I claim is:

1. In the manufacture of steel comprising the steps of producing in a blast furnace a charge of pig iron, blowing said pig iron in an acid Bessemer converter, and refining the blown metal in a basic open hearth furnace, the improvement which comprises adding to the usual charge entering said blast furnace sufficient phosphorus- and manganese-containing slag materials to introduce in said pig iron a manganese content exceeding 5.00% and a phosphorus content exceeding .70%.

2. The process of claim 1, wherein the slag resultant from the blowing of said pig iron in an acid Bessemer converter is returned to a blast furnace and the manganese content thereof recovered therefrom as ferro-manganese, spiegel or pig iron.

3. The process of claim 1, wherein the blown metal is first treated with a basic oxidizing slag to remove therefrom the bulk of the phosphorus forming a phosphorus-containing slag suitable for use as a soil conditioner and the remaining metal refined to the extent desired under a second basic oxidizing slag to produce a steel of the desired composition.

4. The process of claim 1, wherein the phosphorus- and manganese-containing materials added to the charge in said blast furnace is comprised at least in part of open hearth slags.

5. A steel making process comprising producing in a blast furnace a charge of pig iron containing over 5% Mn and over .70% P by adding to the usual burden sufficient phosphorus and manganese-containing slag materials to provide the additional manganese and phosphorus required over that of ordinary pig iron, blowing the pig iron in an acid Bessemer converter to remove therefrom the carbon and to convert the silicon and manganese content into an oxidized slag, separating the said oxidized slag from the metal, recovering the manganese content of said slag by utilizing the slag as part of the burden in a ferro-manganese blast furnace, treating the Mn-free blown metal with a strongly basic oxidizing slag to remove the bulk of the phosphorus content therefrom and to form a P-containing slag suitable for use as a soil conditioner and treating the remaining metal with a second basic oxidizing slag to remove the balance of the phosphorus and other impurities to the extent desired in the forming of a steel of desired composition.

CLARENCE D. KING.